United States Patent
Thompson

(10) Patent No.: US 11,192,558 B2
(45) Date of Patent: Dec. 7, 2021

(54) METHOD, APPARATUS, AND SYSTEM FOR PROVIDING ROAD CURVATURE DATA

(71) Applicant: HERE GLOBAL B.V., Eindhoven (NL)

(72) Inventor: Joshua Thompson, Chicago, IL (US)

(73) Assignee: HERE Global B.V., Eindhoven (NL)

(*) Notice: Subject to any disclaimer, the term of this patent is extended or adjusted under 35 U.S.C. 154(b) by 223 days.

(21) Appl. No.: 16/450,465

(22) Filed: Jun. 24, 2019

(65) Prior Publication Data
US 2020/0398855 A1    Dec. 24, 2020

(51) Int. Cl.
| | |
|---|---|
| B60W 40/072 | (2012.01) |
| G06N 20/00 | (2019.01) |
| G06K 9/00 | (2006.01) |
| G01C 21/30 | (2006.01) |

(52) U.S. Cl.
CPC ........... *B60W 40/072* (2013.01); *G01C 21/30* (2013.01); *G06K 9/00798* (2013.01); *G06N 20/00* (2019.01)

(58) Field of Classification Search
CPC ..... B60W 40/072; G06N 20/00; G01C 21/30; G06K 9/00798
See application file for complete search history.

(56) References Cited

U.S. PATENT DOCUMENTS

| | | | | |
|---|---|---|---|---|
| 5,977,906 A | * | 11/1999 | Ameen | G01S 7/4026 342/174 |
| 6,397,140 B2 | | 5/2002 | Minowa et al. | |
| 6,560,531 B1 | * | 5/2003 | Joshi | G01C 21/30 340/988 |
| 6,718,259 B1 | | 4/2004 | Khosla | |
| 8,204,680 B1 | | 6/2012 | Dorum | |
| 8,229,222 B1 | * | 7/2012 | Silver | G06K 9/481 382/181 |
| 9,880,555 B2 | | 1/2018 | Lynch | |
| 10,043,279 B1 | * | 8/2018 | Eshet | G06T 7/593 |
| 10,121,367 B2 | | 11/2018 | Jammoussi et al. | |

(Continued)

FOREIGN PATENT DOCUMENTS

CN    101324440 A    12/2008

OTHER PUBLICATIONS

Hartman et al., "Night Time Road Curvature Estimation based on Convolutional Neural Networks", Published in IEEE Intelligent Vehicles Symposium (IV) 2013, 1 page.

*Primary Examiner* — Qun Shen
(74) *Attorney, Agent, or Firm* — Ditthavong, Steiner & Mlotkowski

(57) ABSTRACT

An approach is provided for generating road curvature data. The approach, for example, involves map matching location trace data to a road network, wherein the location trace data is associated with ground truth curvature values. The approach also involves dividing the road network into a plurality of bounded areas (e.g., boxes or other shapes). The approach further involves extracting one or more training features for each bounded area of the plurality of bounded areas from the location trace data map matched to said each bounded area. The approach further involves training a machine learning model based on the one or more training features and ground truth curvature values. The approach further involves providing the trained machine learning model to predict the road curvature data.

21 Claims, 13 Drawing Sheets

(56) References Cited

U.S. PATENT DOCUMENTS

| | | | | |
|---|---|---|---|---|
| 2007/0008090 | A1* | 1/2007 | Gertsch | B60Q 9/00 340/435 |
| 2009/0010495 | A1* | 1/2009 | Schamp | B60R 21/0134 382/106 |
| 2010/0329513 | A1* | 12/2010 | Klefenz | G06K 9/00805 382/104 |
| 2015/0170514 | A1* | 6/2015 | Stenneth | G08G 1/0133 701/117 |
| 2016/0104049 | A1* | 4/2016 | Stenneth | G06K 9/3258 382/155 |
| 2019/0102692 | A1* | 4/2019 | Kwant | G06N 20/00 |
| 2020/0282999 | A1* | 9/2020 | Mizrachi | B60W 40/08 |

* cited by examiner

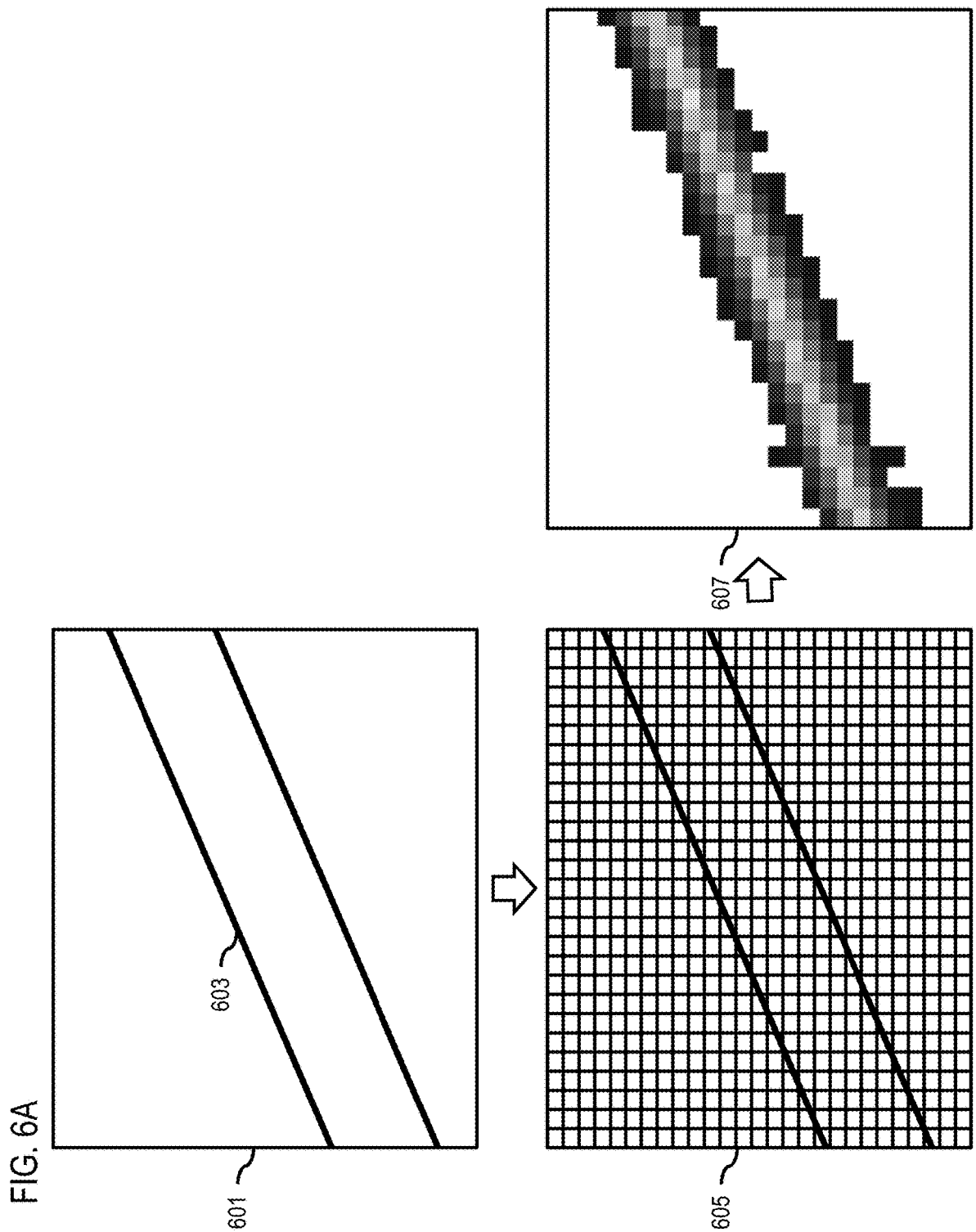

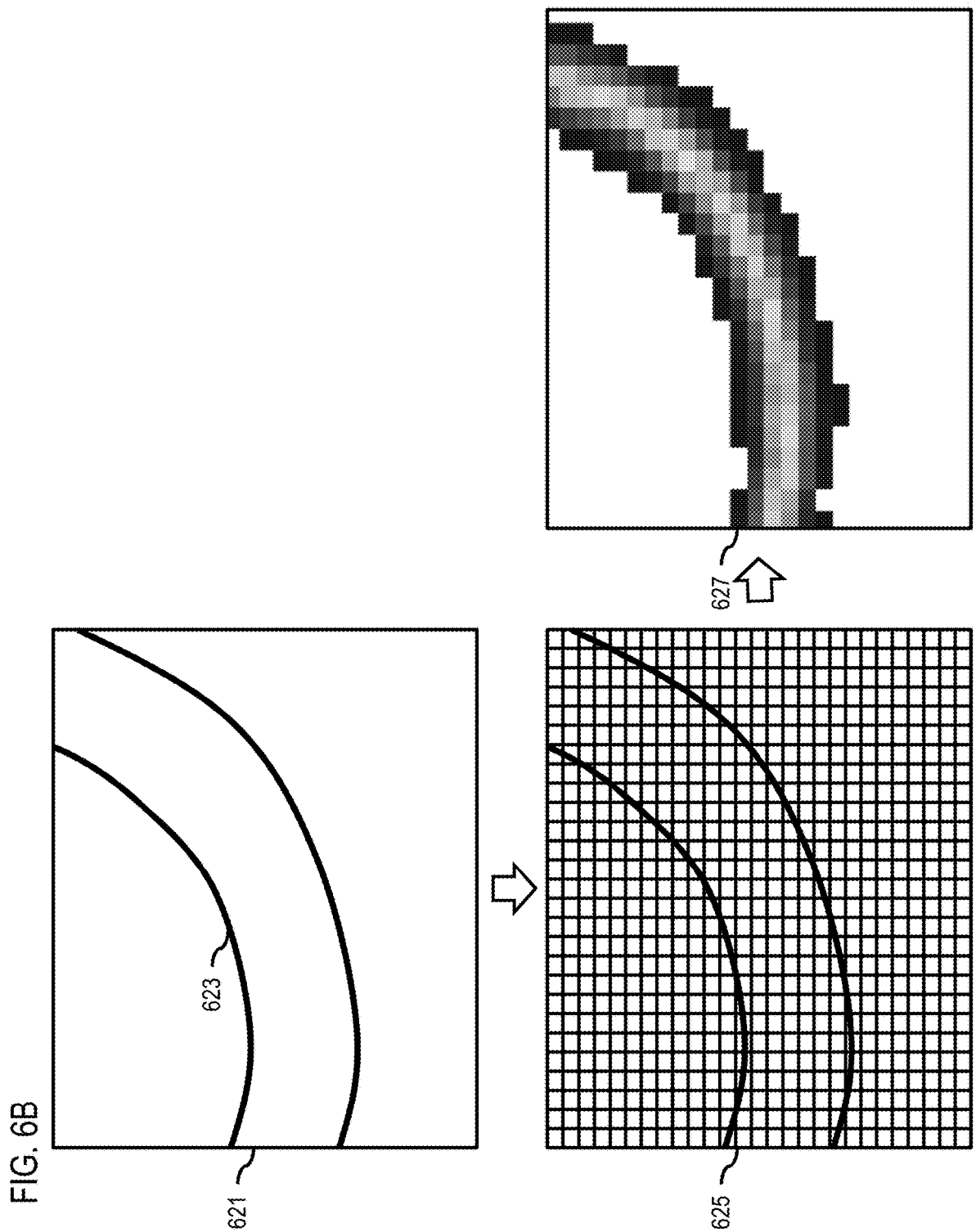

METHOD, APPARATUS, AND SYSTEM FOR PROVIDING ROAD CURVATURE DATA

BACKGROUND

Autonomous vehicles and vehicles equipped with Advanced Driver Assistance Systems (ADAS) help drivers and passengers to more safely navigate the road network by providing or using road characteristics such as curvature, slope, and elevation of roads. Service providers can generate these road characteristics as map attributes. However, because of the complexity of some roads and intersections, characteristics such as road curvature may not be available or are not calculated for inclusion in mapping data. As a result, service providers face significant technical challenges to calculating road curvatures, particularly at intersections or other complex road junctions.

SOME EXAMPLE EMBODIMENTS

Therefore, there is a need for an approach for providing road curvature data.

According to one embodiment, a method comprises map matching location trace data to a road network, wherein the location trace data is an associated with ground truth curvature values. The method also comprises dividing the road network into a plurality of bounded areas (e.g., boxes or other shapes). The method further comprises extracting one or more features (e.g., vehicle density as a function of position, vehicle heading, etc.) for each bounded area of the plurality of bounded areas from the location trace data map matched to said each bounded area. The method further comprises training a machine learning model based on the one or more features and ground truth curvature values. The method further comprises providing the trained machine learning model to predict the road curvature data.

According to another embodiment, an apparatus comprises at least one processor, and at least one memory including computer program code for one or more computer programs, the at least one memory and the computer program code configured to, with the at least one processor, cause, at least in part, the apparatus to map match location trace data to a road network, wherein the location trace data is an associated with ground truth curvature values. The apparatus is also caused to divide the road network into a plurality of bounded areas. The apparatus is further caused to extract one or more features (e.g., vehicle density as a function of position, vehicle heading, etc.) for each bounded area of the plurality of bounded areas from the location trace data map matched to said each bounded area. The apparatus is further caused to train a machine learning model based on the one or more features and ground truth curvature values. The apparatus is further caused to provide the trained machine learning model to predict the road curvature data.

According to another embodiment, a computer-readable storage medium carries one or more sequences of one or more instructions which, when executed by one or more processors, cause, at least in part, an apparatus to map match location trace data to a road network, wherein the location trace data is an associated with ground truth curvature values. The apparatus is also caused to divide the road network into a plurality of bounded areas. The apparatus is further caused to extract one or more features (e.g., vehicle density as a function of position, vehicle heading, etc.) for each bounded area of the plurality of bounded areas from the location trace data map matched to said each bounded area. The apparatus is further caused to train a machine learning model based on the one or more features and ground truth curvature values. The apparatus is further caused to provide the trained machine learning model to predict the road curvature data.

According to another embodiment, an apparatus comprises means for map matching location trace data to a road network, wherein the location trace data is an associated with ground truth curvature values. The apparatus also comprises means for dividing the road network into a plurality of bounded areas. The apparatus further comprises means for extracting one or more features (e.g., vehicle density as a function of position, vehicle heading, etc.) for each bounded area of the plurality of bounded areas from the location trace data map matched to said each bounded area. The apparatus further comprises means for training a machine learning model based on the one or more features and ground truth curvature values. The apparatus further comprises means for providing the trained machine learning model to predict the road curvature data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A and 6B are diagrams illustrating examples of extracting features from location trace data for providing road curvature data, according to one embodiment;

DESCRIPTION OF SOME EMBODIMENTS

Examples of a method, apparatus, and computer program for providing road curvature data using machine learning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
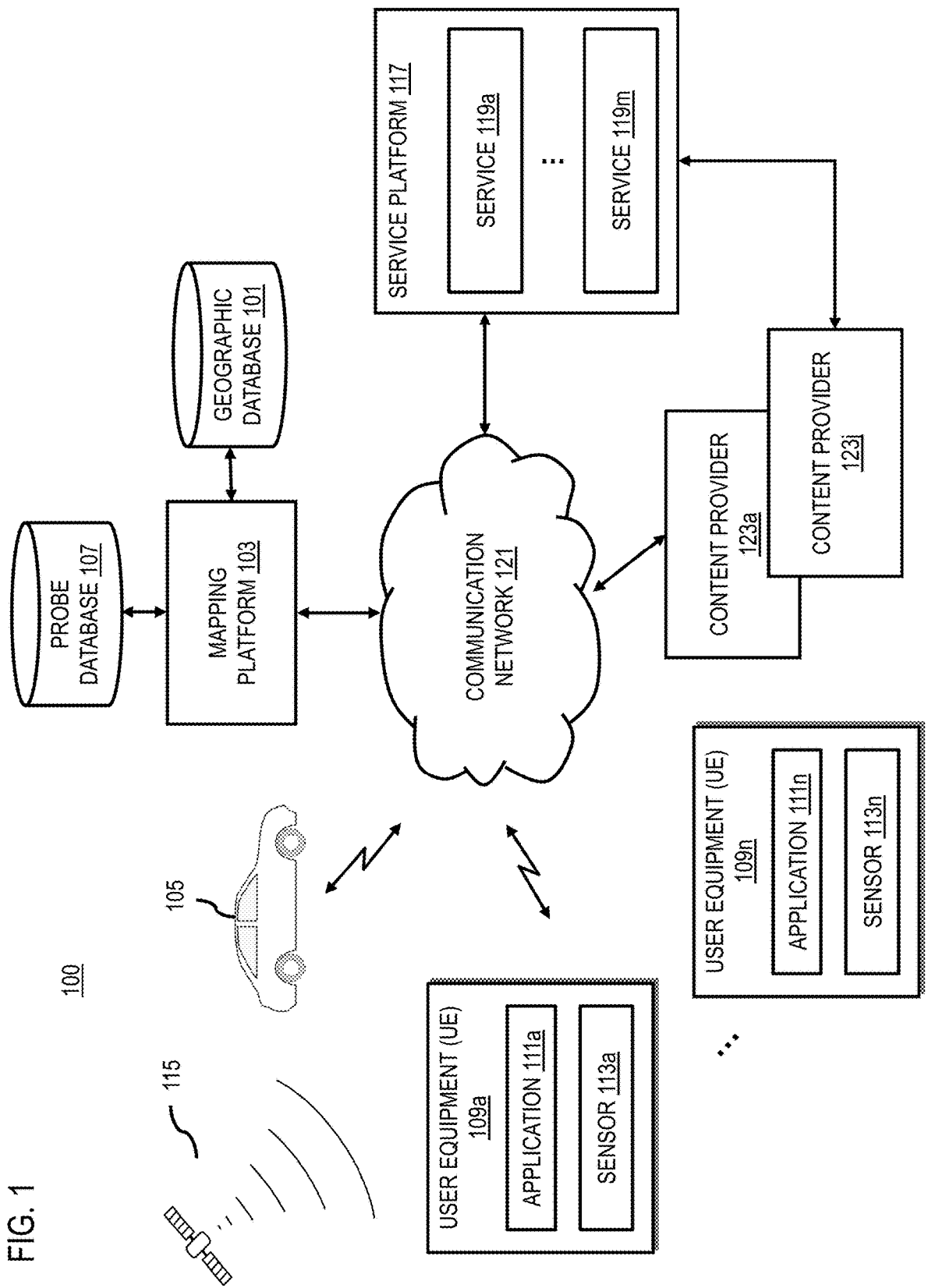
FIG. 1 is a diagram of a system capable of providing road curvature data, according to one embodiment.

FIG. 1 is a diagram of a system capable of providing road curvature data, according to one embodiment. Traditionally, mapping and navigation service providers calculate road curvature from map geometry (e.g., map geometry stored in a geographic database 101 by a mapping platform 103) by fitting splines along the shape points that define the road geometry in digital map data. In general, this approach works well, but it has some limitations:

(1) Curvature may be missing at an intersection point where two splines are joined together;
(2) Any error in the map geometry leads to errors in the derived curvature; and
(3) Splines may be difficult to fit in case of certain geometries with very tight curves, in particular at intersections.

Figure 2:
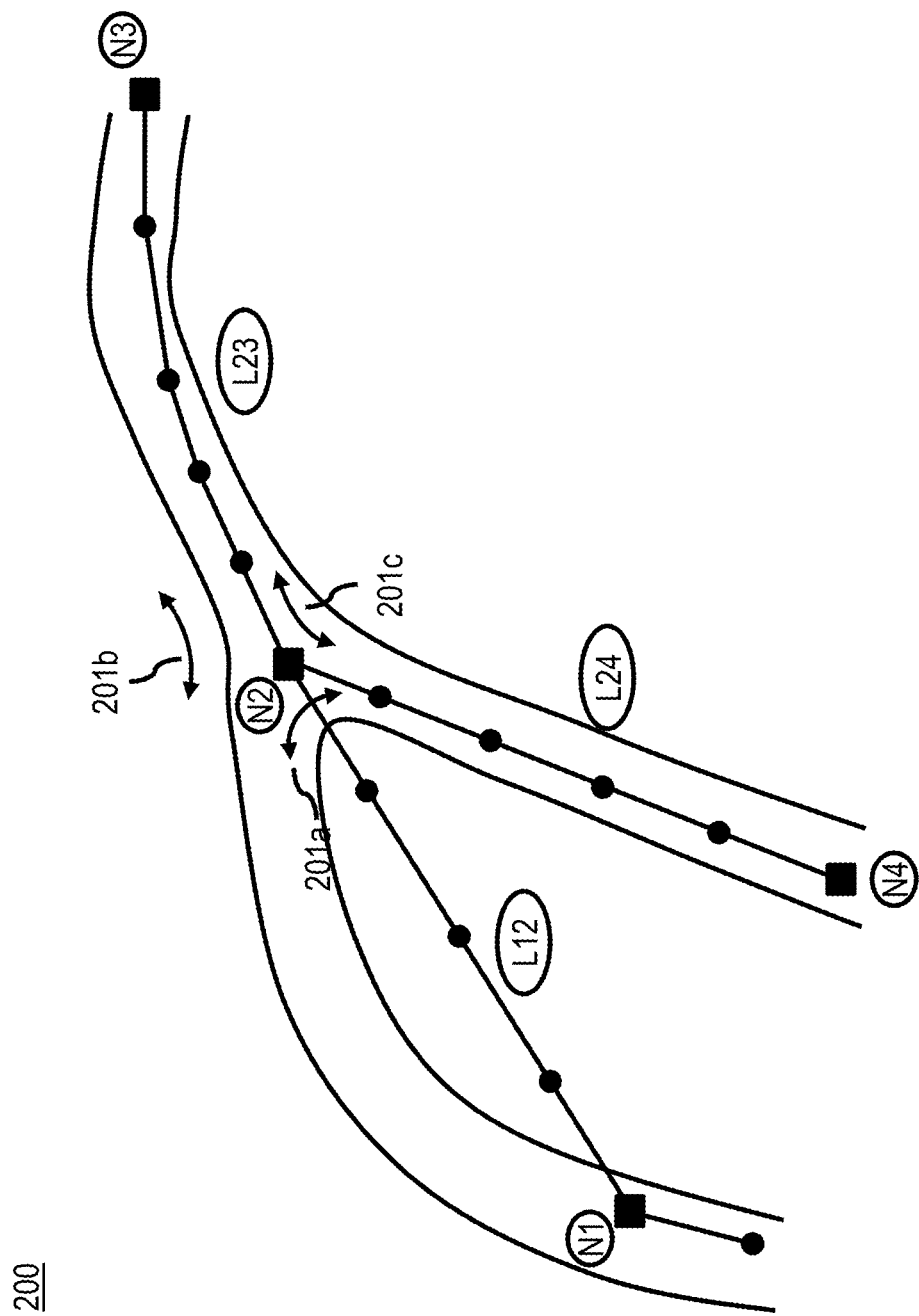
FIG. 2 is a diagram of an example intersection with missing curvature data, according to one embodiment.

FIG. 2 is a diagram of an example intersection 200 with missing curvature data, according to one embodiment. The ends of road segments (e.g., indicated as nodes N1, N2, N3, and N4) are shown by black squares. Shape points along road segments are shown by black dots. Road segments (or links) are labeled as L12, L23 and L24, according to the nodes (e.g., N1-N4) that the segment connects. Node N2 is an intersection. The arrows 201a-201c show the three allowed transitions between the segments at the intersection N2. An allowed transition indicates a road maneuver that is permissible through the intersection N2 (e.g., transition 201a indicates that travel is possible between L12 and L24, transition 201b indicates that travel is possible between L12 and L23, and transition 201C indicates that travel is possible between L24 and L23). In the example of FIG. 2, there are at least three potential issues as described below.

Issue 1: Assume that one spline or smoothing curve is calculated along links L12 and L23 and another spline along link L24. At the intersection point, N2, one can calculate the curvature from L12 to L23 (as the second derivative of the corresponding spline). However, one may not be able to calculate curvatures for the transitions from L12 to L24 and from L24 to L23, if the connection between the two splines is not appropriately smooth to allow calculation of second derivative.

Issue 2: As shown, segment L12 does not accurately follow the road geometry. As a result, the curvature derived from the geometry of this segment will not be accurate.

Issue 3: Even if the L24 spline would connect smoothly to L23 (so that a curvature between L24 and L23 can be calculated), it is sometimes difficult to generate a spline connecting L12 and L24 due to the very large turn angle. In such situation, traditional map data generally does not provide a curvature.

In summary, a traditional method for calculating curvature along a road network is to fit splines (e.g., a mathematical function for interpolating or smoothing) along the shape points that define the road geometry. For example, splines are fitted along stretches of road represented by chains of links/segments. At intersections, these chains can be chosen by following empirical rules, such as following the most important roads or minimum transition angle. This method can work well, in general, but has the potential issues or limitations described above.

Figure 3:
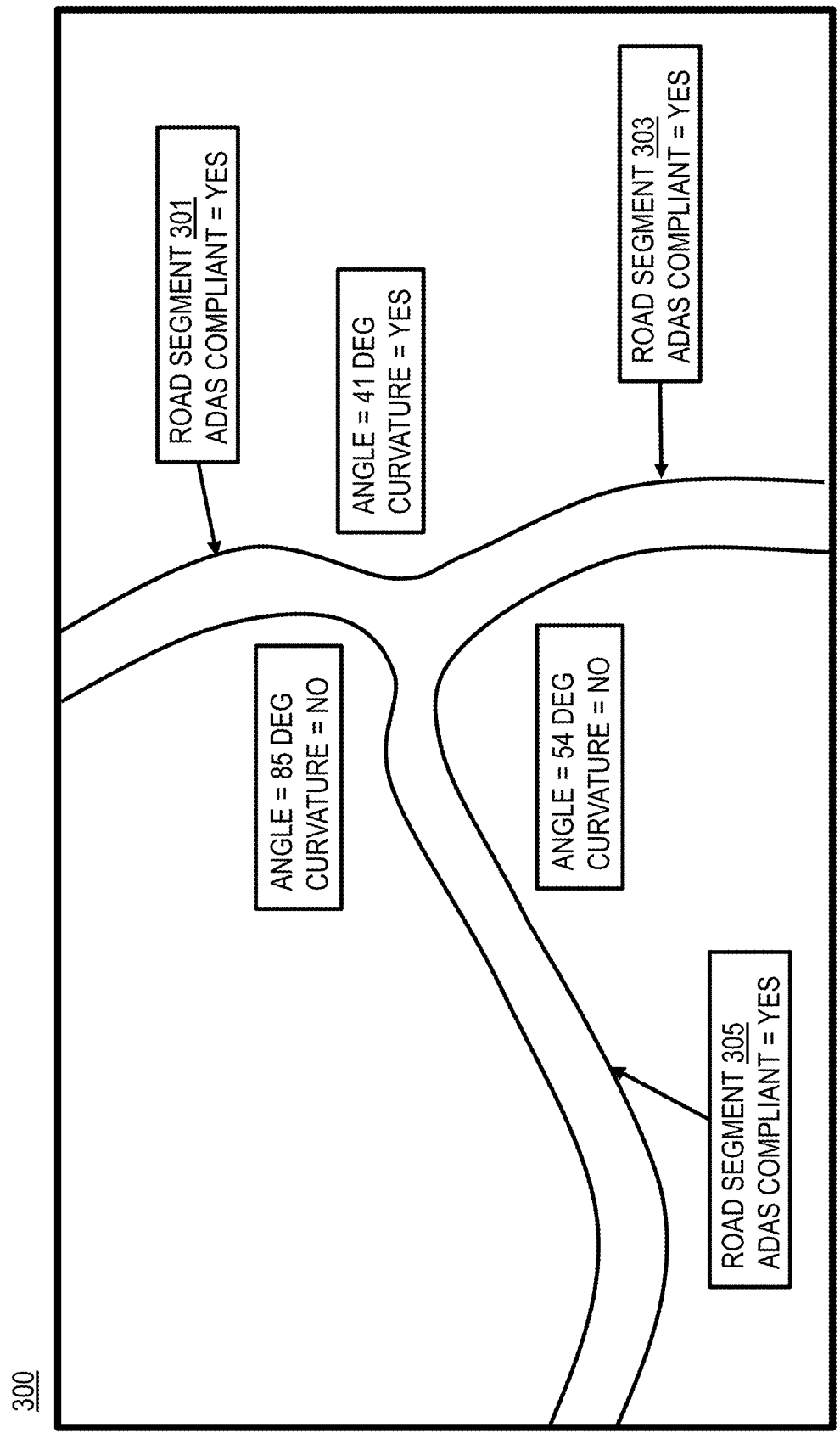
FIG. 3 is diagram of another example intersection with missing curvature data, according to one embodiment.

For example, at certain intersections, such as three-way intersections/ramps/exits, one spline will traverse the intersection along the main road, while another spline (describing the entry/exit or lower importance road) is connected to the main one at a given angle. Such a situation is shown in FIG. 3, which is another example intersection 300 with missing curvature data for some road segments of the intersection (e.g., missing curvature is labeled with text indicating "Curvature=No"). In the example of FIG. 3, one spline traverses the intersection connecting segments 301 and 303, while another spline, corresponding to segment 305 is connected to the first spline. At the intersection point, one should be able to provide three curvatures corresponding to the transition between each pair of connecting road segments. However, since the curvature can only be calculated along a spline, but not at the intersection of two splines (if the connection is at an angle), the traditional digital map for intersection 300 provides curvature along the road segment 301 to road segment 303 transition, but not along the other two transitions: (1) road segment 301 to road segment 305 transition, and (2) road segment 303 to road segment 305 transition. Therefore, map service providers face significant technical challenges with respect to providing accurate road curvature data, particularly for road segments there two or more different splines meet.

To address these technical challenges, the system 100 of FIG. 1 introduces a capability to derive or predict road curvature data from location trace data using a machine learning approach. By way of example, the system 100 collects the location trace data (e.g., probe data 107) from vehicles 105 and/or user equipment (UE) devices 109*a*-109*n* (also collectively referred to as UEs 109) respectively equipped with applications 111*a*-111*n* (also collectively referred to as applications 111) and sensors 113*a*-113*n* (e.g., positioning sensors capable of determining a location based on signals from satellites 115). In one embodiment, roads are divided into small slices (e.g., corresponding to bounded areas such as but not limited to boxes, grid cells, or other shapes). It is noted that although several of the various embodiments are described using a box as an example bounded area or shape, it is contemplated that any type or shape of bounded area (e.g., cell, shape, etc.) that can be used to divide a road network can be used in the embodiments described herein. Location trace data (e.g., vehicle GPS trace data) associated with a slice, bounded area, or box is used to calculate features (e.g., the vehicle density as a function of position, and optionally the vehicle heading). A supervised machine learning model is trained using slices or boxes labeled with the "true curvature" taken from a trusted source (e.g., calculated using the traditional map-based curvature method). Once trained, this trained machine learning model can be applied to other areas of the road network to determine the curvature.

The road curvatures derived or predicted by the embodiments of the system 100 (e.g., a machine learning system) described herein have the advantage that they do not depend on the accuracy of the map's road geometry, nor do they depend on the construction of splines from the map geometry. In one embodiment, the road curvatures based on location trace data can then serve as an independent cross-check of the curvatures computed from the road geometry. Accordingly, the system 100 can determine discrepancies between the machine learning-based curvature of and the curvature results based on road geometry to automatically detect portions of the road where the geometry should be scrutinized for potential errors.

Figure 4:
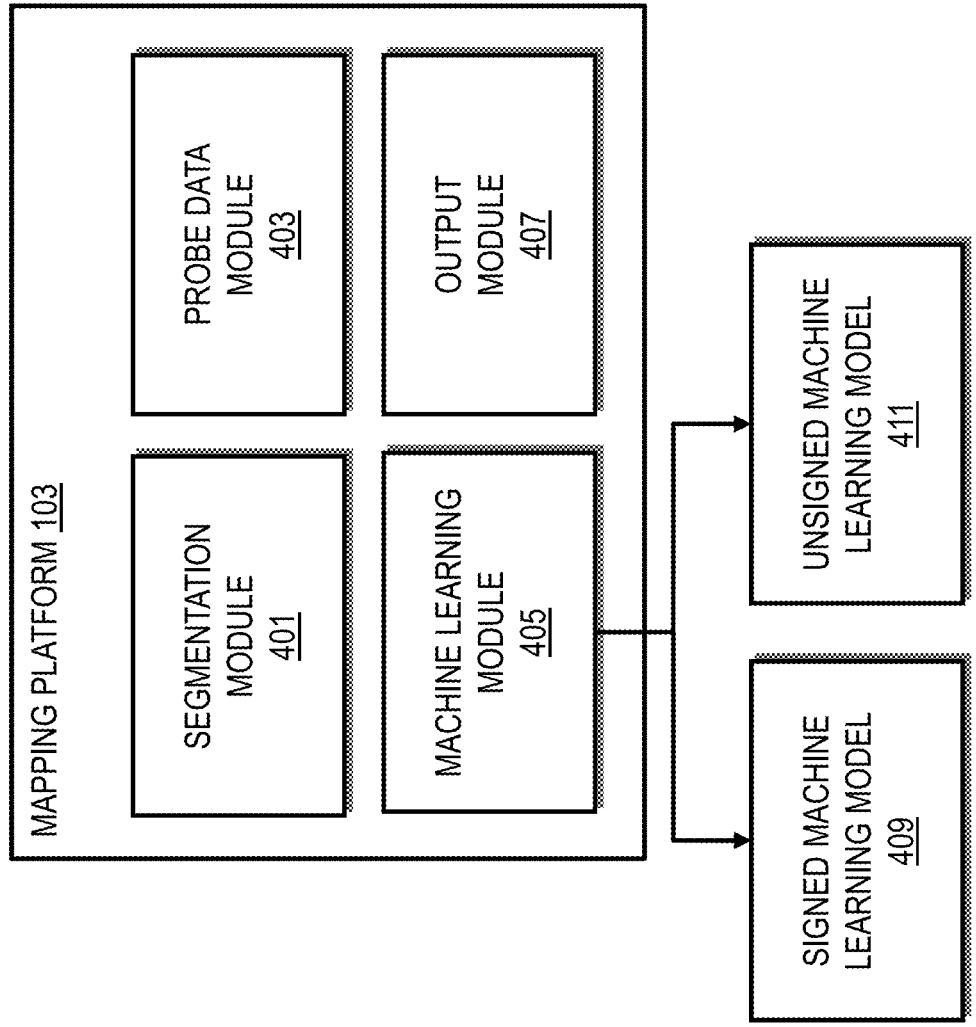
FIG. 4 is a diagram of components of a mapping platform capable of providing road curvature data, according to one embodiment.

In one embodiment, the system 100 includes a mapping platform 103 that is capable of performing one or more functions related to providing road curvature data, according to one embodiment. As shown in FIG. 4, the mapping platform 103 includes one or more components to perform the functions. It is contemplated that the functions of these components may be combined or performed by other components of equivalent functionality. In this embodiment, the mapping platform 103 includes a segmentation module 401, probe data module 403, machine learning module 405, and output module 407. In one embodiment, the machine learning module 405 further has connectivity to one or more machine learning models (e.g., machine learning models 409 and 411 such as neural networks or equivalent) that can be trained and/or used to predict road curvature data from location trace data according to the embodiments described herein. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of a services platform 117, any of the services 119*a*-119*m* (also collectively referred to as services 119) of the services platform 117, vehicles 105, UE device 109, application 111 executing on the UE 109, etc.). In another embodiment, one or more of the modules 401-407 may be implemented as a cloud-based service, local service, native application, or combination thereof. The functions of the mapping platform 103 and the modules 401-407 are discussed with respect to FIGS. 5-7 below.

Figure 5:
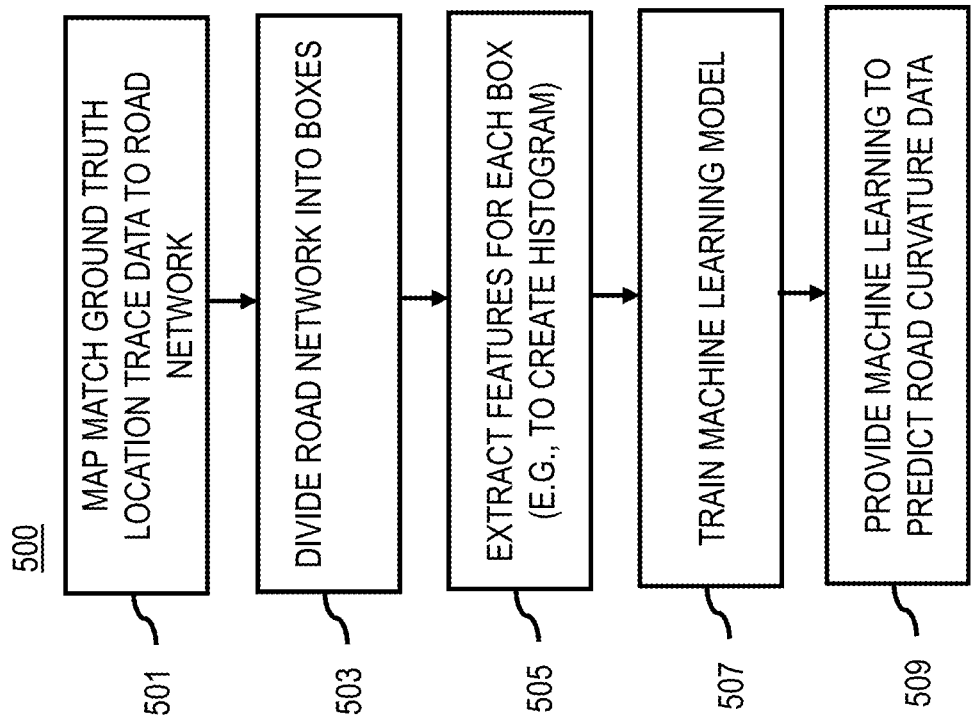
FIG. 5 is a flowchart of a process for training a machine learning system to provide road curvature data, according to one embodiment.
Figure 10:
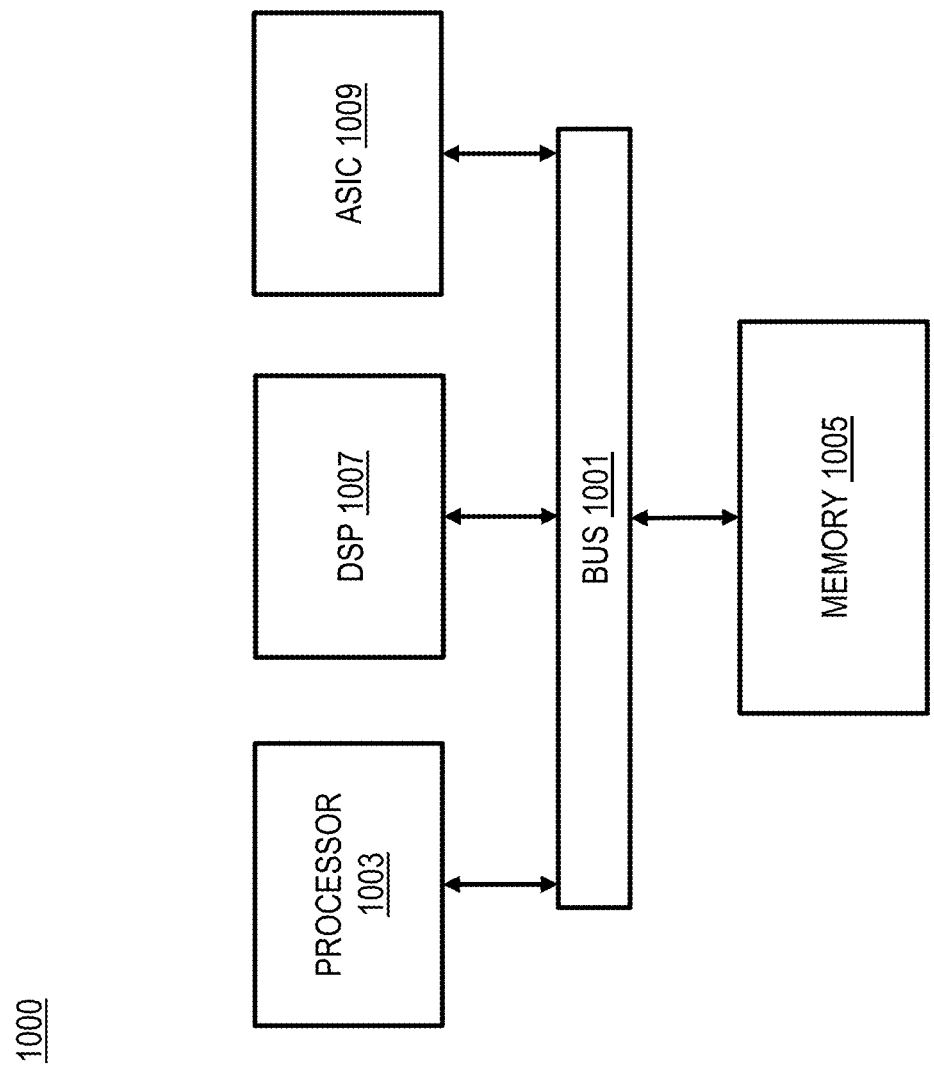
FIG. 10 is a diagram of a chip set that can be used to implement an embodiment.

FIG. 5 is a flowchart of a process for training a machine learning system to provide road curvature data, according to one embodiment. In various embodiments, the mapping platform 103 and/or any of the modules 401-407 of the mapping platform 103 may perform one or more portions of the process 500 and may be implemented in, for instance, a chip set including a processor and a memory as shown in FIG. 10. As such, the mapping platform 103 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the process 500 can be used as part of an overall process or system for determining the curvature of a road network (at intersections or any other point) using location trace data. In one embodiment, the probe data module 403 can collect the location trace data (e.g., GPS probe data) from probe vehicles 105 and/or probe UE devices 109 traveling in the road network of interest. The location trace data can include probe data comprising probe vehicle trajectories which are timestamped location samples collected by location sensors 113 of a probe vehicle 105 and/or probe UE device 109, and/or stored in the probe database 107. The probe data module 403 can optionally apply data cleaning for the location trace data to remove anomalous data (e.g., remove points or whole traces that do not follow the expected data frequency, remove points that are too close to the previous point in space and/or time, etc.). For example, the probe data module 403 can select only the location points of the location trace data which are separated by a configured number of location error standard deviations (e.g., GPS or equivalent error). Assuming that the GPS error is for instance about 7 meters and the threshold standard deviation number is 3, the probe data module 403 may select only the GPS points which are more than 3×7 m=21 meters apart. The rest of the location points (e.g., in between the selected location points) are dropped or removed from the location trace data that is to be process. This advantageously ensures that the mapping platform 103 can avoid back-and-forth location error fluctuations (e.g., GPS fluctuations) when the probe vehicle 105 and/or probe UE 109 are moving very slowly or at rest.

In step 501, once the location trace data is optionally cleaned, the probe data module 403 can map match all location traces in the location trace data to the road links of a road network as represented in digital map data (e.g., the geographic database 101). Map-matching, for instance, correlates the raw location or GPS coordinates in the location trace data to a corresponding road link, lane of the road link, or portion thereof.

Then, in step 503, the segmentation module 401 divides the road network using square boxes, grid cells, and/or any other bounded shape or area. By dividing the road network into boxes, the segmentation module 401 effectively slices the road segments or links forming the road network into slices equal to the size of the boxes. In one embodiment, the boxes need not be uniform in size and can have variable sizes that can vary between different boxes or shapes. For example, a typical box might be 50 meters by 50 meters (the exact value can be adjusted). For each single box, the mapping platform 103 collects and uses the location trace data falling in this box that has been map-matched to the road segment or segments in the box. The start and end of the road boxes or slices, in general, do not or need not correspond with road intersections. Instead, these boxes may span across intersections, junctions, or other road network structures that combine or include multiple road segments or links. In one embodiment, if the box contains an intersection or other junction, the mapping platform 103 will consider only one fork of the intersection or junction at a time (and the location trace data that follows a trajectory consistent with that fork). In yet another embodiment, the mapping platform 103 will also only consider one direction of travel at a time. In other words, the location trace data in each box can be filtered depending on the fork of the intersection and/or a travel direction. The filtered location trace data can then be used to determine different road curvature values for each different fork and/or direction of travel.

In step 505, for each box, the machine learning module 405 can construct the features for training one or more machine learning models (e.g., machine learning models 409 and/or 411) by extracting training features for each box of the plurality of boxed from the location trace data map matched to each box. In one embodiment, the machine learning module 405 converts the raw location trace data (e.g., GPS data in latitude/longitude format (degrees)) to a local coordinate system (e.g., a rectilinear or equivalent coordinate system) of the corresponding box. For example, given a box size of 50 meters by 50 meters, the x axis of the local rectilinear coordinate system will be span 0 to 50 meters, and the y axis of the local rectilinear coordinate will also span 0 to 50 meters. The raw location coordinates falling within the box would be converted or transposed to this local system so that the coordinates. If the local coordinate (0,0) corresponds, for instance, to the lower left corner of the box, then the raw coordinates (e.g., latitude/longitude) corresponding to that position in the global latitude/longitude coordinate system would be converted to (0,0).

The location trace data is then used to create a two-dimensional histogram with N bins in each dimension (e.g., for a square box with N being the length of each side of the box in meters such that each bin represents a 1 square meter area of the box. In one embodiment, the content of each bin of the histogram can be based on a characteristic of feature (e.g., vehicle density at a given location, vehicle heading, etc.) of the corresponding location trace data. FIGS. 6A and 6B are diagrams illustrating examples of extracting features from location trace data for providing road curvature data, according to one embodiment. More specifically, FIG. 6A illustrates an example box 601 containing a road segment 603 (e.g., the portion of the road that falls within the boundary of the box 601) with slight curvature, and FIG. 6B illustrates an example box 621 containing a road segment 623 with a more pronounced curvature. Each box 601 and 621 is converted into a respective local rectilinear coordinate system that further divides each box 601 and 621 into bins as shown respectively in local coordinate system diagrams 605 and 625.

The machine learning module 405 then processes the location trace data falling into each bin of the local coordinate system (e.g., location coordinate systems 605 and 625) to determine the content of each bin. For example, in a use case where the feature of interest is vehicle density, the content of each bin of the plurality of bins includes a count of one or more locations traces of the location trace data falling within said each bin. The vehicle density or counts are then represented in the respective histograms 607 and 627 of FIGS. 6A and 6B.

In one embodiment, each trace contributes a variable number of location trace points to the histogram, depending on how many points from that trace fall in the box. The machine learning module 405 can assign different weights to the points from each trace using any weighting scheme such as but not limited to: a uniform weight of 1, and a weight of 1/m where m is the number of points in that trace that fall in the box. In other words, the machine learning module 405 can determine a weight for each location trace of the one or more location traces based on a number of locations points contributed by each location trace to each box. The content of each bin of the box can then be further based on the weight for each location trace. In one embodiment, the machine learning model can subsequently normalize the histogram by dividing each bin's content by the sum of the content of all of the bins, or use any other equivalent normalizing process.

In the examples of FIGS. 6A and 6B, the histograms 607 and 627 are example histograms of GPS data from single roads passing through 50×50 meter boxes 601 and 621. As noted above, the road segment 603 of FIG. 6A has a slight curvature while the road segment 623 of FIG. 6B has a pronounced curvature. Each axis of the histograms 607 and 627 are in units of meters. The shading of each bin of the histograms 607 and 627 indicates the weighted number of location or GPS points in that bin of the histogram (white indicates no data).

In one embodiment, the histogram contents are converted to features by simply unrolling the histogram into a one dimensional array in a deterministic fashion. The contents of each bin become 1 feature, e.g., for N=25 there will be $N^2=25\times25=225$ features. Optionally, an additional feature that provides the scale of the box can be included (e.g., in this case it would be 50.0 because the box has sides of 50 meters). This scale feature can be used in embodiments in which the boxes can have variable size. However, the scale feature is not necessary in embodiments in which the boxes always have the same size.

In one embodiment, the machine learning module 405 can train a machine learning model based just on vehicle density and/or scale. However, a model containing only these features can only predict the magnitude of the curvature, not the sign of the curvature (e.g., positive or negative curvature). Thus when a model a trained only on these features, the model can be referred to as an unsigned machine learning model 411.

Optionally, in some embodiments, the heading information from the location trace data can also be used to provide for a model that can determine the sign of the curvature (e.g., signed machine learning model 409). For example, the machine learning module 405 can incorporate vehicle heading into a machine learning model using processes such as but not limited to the following two approaches:

(1) Using a binning scheme identical to the one described above, the average heading of the location trace data is computed in each bin. For example, the machine learning module 405 can using any technique for calculating the average of an angle such as but not limited to: atan 2(average(sin(h)), or average(cos(h)). It is noted that in this case, histogram bins with no data can receive a dummy value for the feature value.

(2) Using the assumption that the heading does not change substantially over the width of the box, the machine learning module 405 can compute a single average heading for all of the points in the box.

In the case of option 1, the $N^2(+1)$ features of the original model will become $2N^2(+1)$ features. In the case of option 2, the machine learning module 405 will have $N^2+1(+1)$ features. Using one of these options allows the model to predict not only the magnitude of the curvature, but also the sign to generate a signed machine learning model 409.

In step 507, the machine learning module 405 trains one or more machine learning models (e.g., signed machine learning model 409 and/or unsigned machine learning model 411) using training location trace data collected on road segments known to have good or ground truth curvature values in a pre-existing database (e.g., curvature values calculated using traditional techniques such as determined using surveying techniques). In one embodiment, the training location trace data should include a wide variety of true curvature values, ranging from very straight to very curved. The training sample should also contain roads with a variety of characteristics in terms of number of lanes and speed limits. For example, for each point where the true curvature is known, a box is constructed around that point and the features are calculated as described above. The features and the true curvature (signed or unsigned, depending on the model being trained) for a large number of points then form the training data for the model.

In one embodiment, the machine learning module 405 can standardize the extracted feature set to generate training input data. For example, standardization can include but is not limited to mean subtraction from each feature, normalization by the standard deviation, and/or the like. In one embodiment, the machine learning model could be any number of varieties of regression models including but not limited to neural networks, support vector machines, or equivalent.

In one embodiment, the machine learning module 405 can use supervised learning to train a machine learning model using the ground truth curvature data together with the extracted features described in the embodiments above. For example, during training, the machine learning module 405 uses a learner module that training data set into the machine learning model to compute a predicted feature set (e.g., predicted road curvatures values based on location trace data features) using an initial set of model parameters.

The learner module then compares the predicted feature set to the ground truth data (e.g., ground truth road curvature values at known locations). For example, the learner module computes a loss function representing, for instance, an accuracy of the predictions for the initial set of model parameters. In one embodiment, the machine learning module 405 computes a loss function for the training of the machine learning module based on the ground truth road curvature data. The learner module then incrementally adjusts the model parameters until the model minimizes the loss function (e.g., achieves a maximum prediction accuracy with respect to extracted location trace data features). In other words, a "trained" feature prediction model is a classifier with model parameters adjusted to make accurate predictions with respect to the ground truth data.

In one embodiment, the hyperparameters of the machine learning model can be optimized using techniques such as cross-validation. These techniques can also be used to check the performance of the model.

In step 509, the output module 407 can provide the trained machine learning model to predict the road curvature data. In one embodiment, based on what models were trained, the mapping platform 103 can provide a signed machine learning model 409 (e.g., training using probe/vehicle density and probe/vehicle heading features) that can predict a sign of the curvature in addition or as an alternate to predicting a magnitude of the curvature and/or an unsigned machine learning model 411 (e.g., trained on probe/vehicle density) that can predict just the magnitude of the curvature. In one embodiment, the output module 407 can provide either one or both of the signed machine learning models 409 or unsigned machine learning models 411 for use in predicting road curvature data from location trace data according to the embodiments described. An example process for using machine learning to predict road curvature data is described below with respect to FIG. 7A.

Figure 7A:
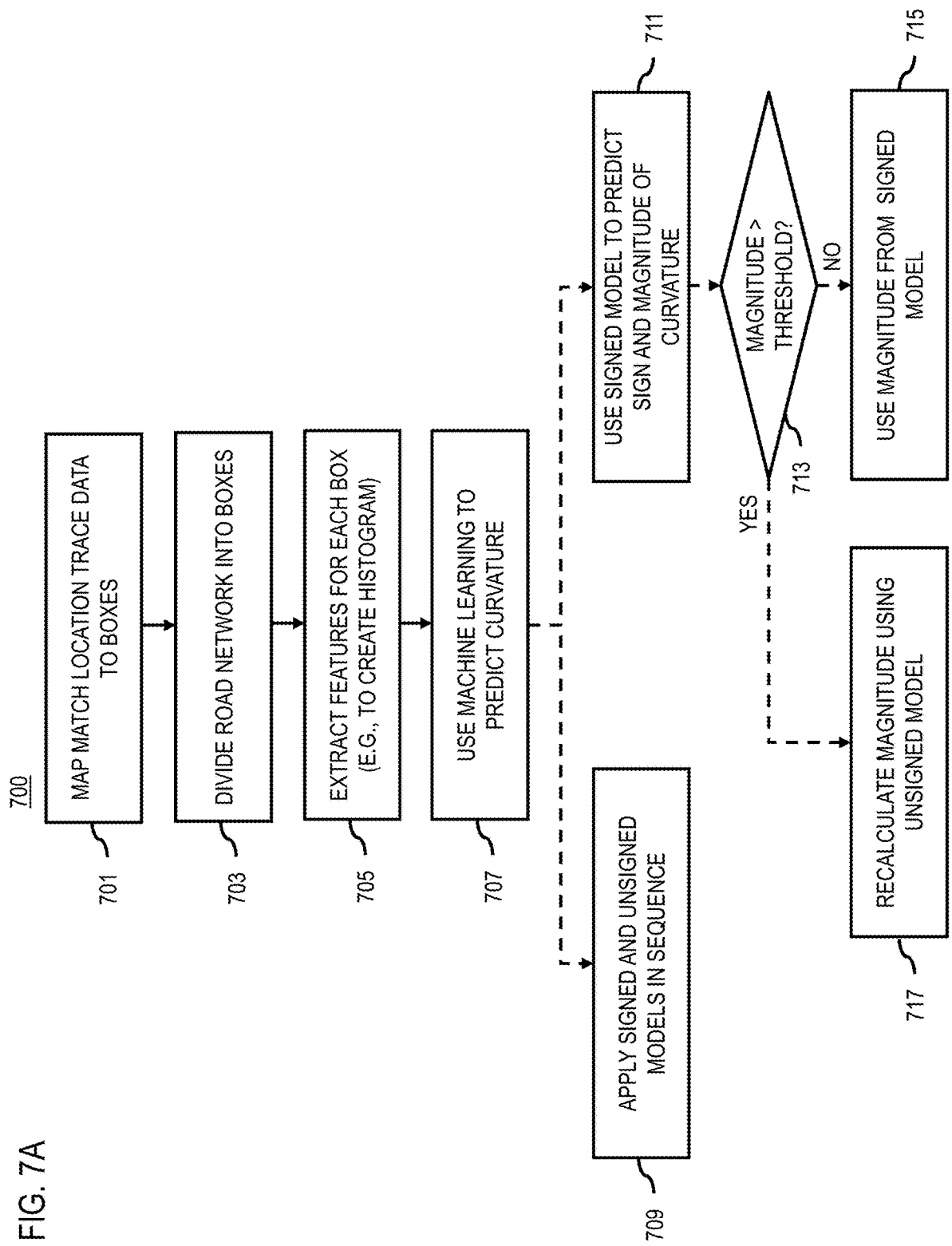
FIG. 7A is a flowchart of a process for using a machine learning system to provide road curvature data, according to one embodiment.

FIG. 7A is a flowchart of a process for using a machine learning system to provide road curvature data, according to one embodiment. In various embodiments, the mapping platform 103 and/or any of the modules 401-407 of the mapping platform 103 may perform one or more portions of the process 700 and may be implemented in, for instance, a chip set including a processor and a memory as shown in FIG. 10. As such, the mapping platform 103 and/or the modules 401-407 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

Once the machine learning model or system (e.g., signed machine learning model 409 and/or unsigned machine learning model 411) is trained, it can be used to predict the road curvature on new areas of the map using the location trace data (e.g., GPS probe data) collected in those areas.

In step 701, the probe data module 403 collects and map matches location trace data from the areas of the road network for which road curvature data is to be predicted. The areas can be new areas of the road network in which road curvature data is been unavailable or areas with existing road curvature data that is to be updated or checked for errors.

In step 703, the segmentation module 401 divides the road network and the corresponding map matched data into boxes as described with in the embodiments of the process 500 of FIG. 5 above. For each box, the machine learning module 405 can create a histogram of the location trace data to extract features (e.g., probe/vehicle density for the signed model 409, and probe/vehicle density and probe/vehicle heading for the signed model 411) (step 705) for use as input data to the trained models to predict road curvature (e.g., sign and/or magnitude of road curvatures) (step 707).

In one embodiment, both types of models (signed machine learning model 409 and unsigned machine learning model 411) could be used in combination. For example, in step 709, if the unsigned model 411 tends to have less variance in the output (according to performance checks performed with testing data), then the two models could be applied in sequence. The machine learning module 405, for instance, can use the signed model 409 to predict the sign of the road curvature (e.g., positive curvature or negative curvature) from the location trace data of each box of the road network, and then use the unsigned model 411 to predict the magnitude of the road to the road curvature for the same box.

In some cases, there are indications that the unsigned model 411 can be biased for curvatures near 0 (e.g., perfectly straight roads) while the signed model 409 may not show the same bias. Accordingly, in one embodiment, the machine learning module 405 may combine the signed model 409 and unsigned model 411 by first using the signed model 409 to predict the sign and the magnitude of the road curvature based on the location trace data of a given box of the road network (step 711). In step 713, the machine learning module 405 can evaluate the predicted magnitude against a threshold value. If the magnitude is below the threshold (e.g., indicating that the curvature is nearer to 0 or nearer to be completely straight), the machine learning module 405 can use the predicted sign and magnitude from the signed model 409 as the output provided by the output module 407 (step 715). On the other hand, if the magnitude predicted by the signed model 409 is greater than the threshold, the machine learning can recalculate the predicted magnitude using the unsigned model 411 (step 717). The machine learning module 405 can then use the predicted magnitude from the unsigned model 411 and the predicted sign from the signed module 411 as the output provided by the output module 407.

In one embodiment, the output module 407 provides the road curvature data for each box for any number of location-based applications and/or services. Examples of these service and/or application include but are not limited to mapping, navigation, user alerts, autonomous driving, and/or the like. For example, the road curvature data can be used to update road curvature data more frequently that possible using traditional techniques (e.g., surveying using specialized mapping vehicles). In other user cases, the road curvature data predicted from location trace data can be used to check or confirm the accuracy of existing road curvature data or road geometry data of the geographic database 101 (e.g., road curvature data generated based on the previously mapped road geometry). In one embodiment, the road curvatures predicted from location trace data using machine learning can be output as an artifact or data layer of the geographic database 101.

One example application can include but is not limited to providing alerts or notifications to warn drivers of roads with curvatures above a threshold value. As a driver travels along a road network, the system 100, vehicle 105, UE 109, or other equivalent system or device can determine the road that a user is traveling or is expected to travel (e.g., based on current positioning data, travel history, computed navigation routes, etc.). The road curvature data can then be retrieved from the geographic database 101 or equivalent and compared to a threshold value used to distinguish high curvature roads. If the retrieved road curvature exceeds the curvature threshold, an alert or notification message is generated and presented to the driver via a user interface to inform the driver of the upcoming high curvature road. In an autonomous driving use case, an autonomous vehicle 105 can use the retrieved road curvature data to automatically adjust its autonomous driving. For example, the autonomous vehicle 105 can slow down in areas of high road curvature or request that a human operator take manual control.

Figure 7B:
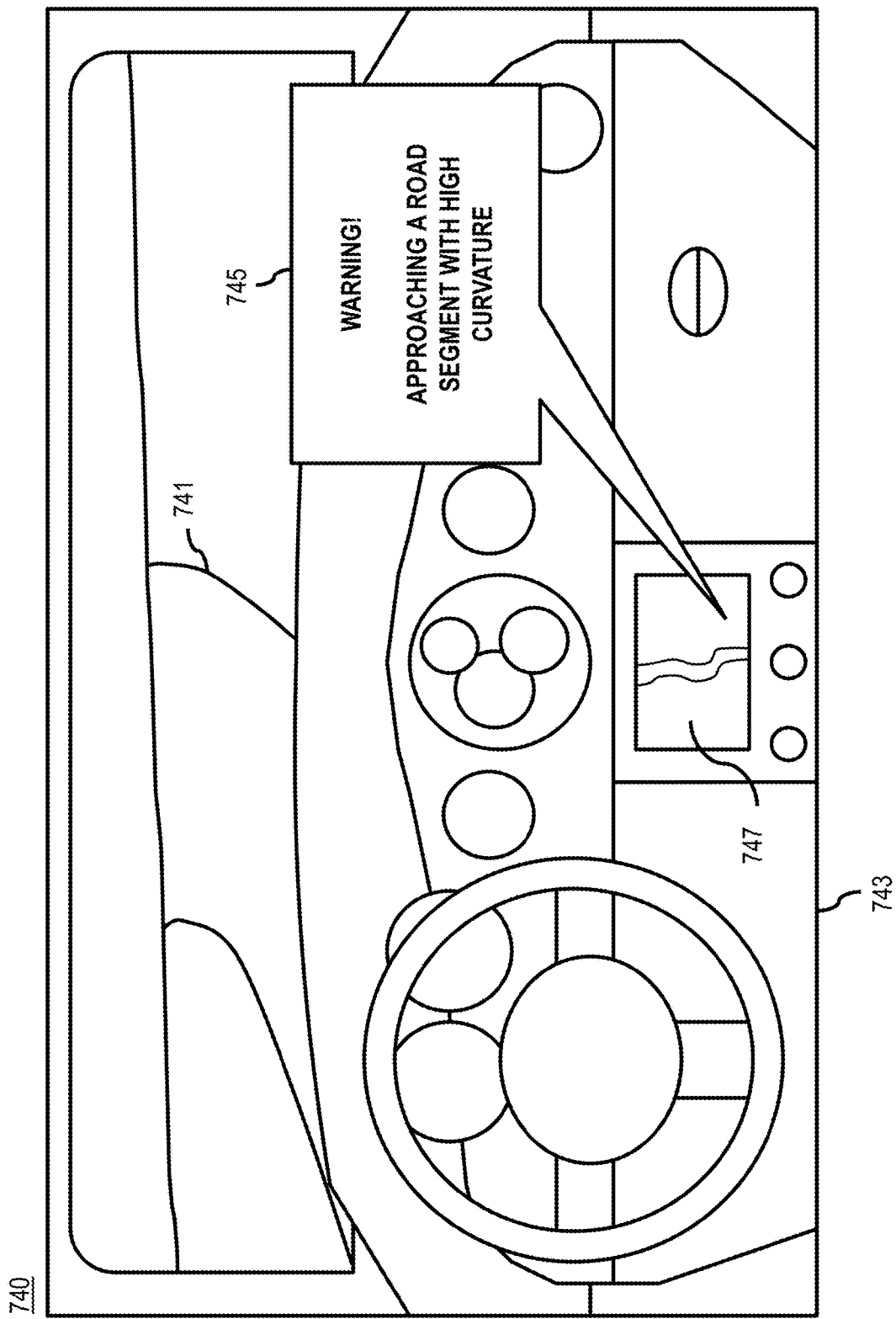
FIG. 7B illustrates an example user interface for presenting a notification based on road curvature data, according to one embodiment.

FIG. 7B illustrates an example in-vehicle UI 740 that presents a warning to a driver based on a road segment 741 having a road curvature value above a threshold value, according to the embodiments described herein. In this example, a driver of a vehicle 743 is approaching the road segment 741 using navigation, mapping, and/or autonomous driving system 747 that relies on digital map data incorporating road curvature data generated according to the embodiments describe herein. The system 747 of the vehicle 743 can use the road curvature data to identify that the road segment 741 has a road curvature that exceeds a threshold value. In response, a warning message 745 is generated and then presented via the in-vehicle system 747 to warn the driver that the vehicle 743 is "Approaching a road segment with high road curvature." In a use case where the vehicle 743 is operating in autonomous driving mode, the in-vehicle system 743 can instruct the driver to take manual control or the system 743 can take or recommend a more conservative path through the road segment 741 in response to the high road curvature.

Returning to FIG. 1, the system 100 comprises one or more probe vehicles 105 and/or one or more probe UEs 109 having connectivity to the mapping platform 103 via a communication network 121. By way of example, the UEs 109 may be an in-vehicle or embedded navigation system, a personal navigation device ("PND"), a portable navigation device, a cellular telephone, a mobile phone, a personal digital assistant ("PDA"), a watch, a camera, a computer and/or other device that can perform navigation or location-based functions (i.e., digital routing and map display). It is contemplated, in future embodiments, that the cellular telephone may be interfaced with an on-board navigation system of an autonomous vehicle or physically connected to the vehicle for serving as the navigation system. Also, the vehicles 105 and/or UEs 109 may be configured to access the communication network 121 by way of any known or still developing communication protocols. Via this communication network 121, the vehicles 105 and/or UEs 109 may transmit probe data as well as access various network based services for facilitating state classification.

Also, the UEs 109 may be configured with mapping, navigation, and/or other location-based applications 111 for interacting with one or more content providers 123a-123j (also collectively referred to as content providers 123), services 119 of a service platform 117, or a combination thereof. Per these services, the applications 111 of the vehicle 105 and/or UE 109 may acquire navigation information, location information, mapping information and other data associated with the current location of the vehicle, a direction or movement of the vehicle along a roadway, etc. Hence, the content providers 123 and services 119 rely upon the gathering of probe data for providing curvature data.

The vehicles 105 and/or UEs 109 may be configured with various sensors 113 for acquiring and/or generating probe data regarding a vehicle, a driver, other vehicles, conditions regarding the driving environment or roadway, etc. For example, sensors 113 may be used as GPS or other positioning receivers for interacting with one or more satellites 115 to determine and track the current speed, position and location of a vehicle travelling along a roadway. In addition, the sensors 113 may gather tilt data (e.g., a degree of incline or decline of the vehicle during travel), motion data, light data, sound data, image data, weather data, temporal data and other data associated with the vehicle and/or UEs 109 thereof. Still further, the sensors 113 may detect local or transient network and/or wireless signals, such as those transmitted by nearby devices during navigation of a vehicle along a roadway. This may include, for example, network routers configured within a premise (e.g., home or business), another UE 109 or vehicle 105 or a communicable traffic system (e.g., traffic lights, traffic cameras, traffic signals, digital signage). In one embodiment, the mapping platform 103 aggregates probe data gathered and/or generated by the vehicles 105 and/or UEs 109 resulting from the driving of multiple different vehicles over a road/travel network.

By way of example, the mapping platform 103 may be implemented as a cloud based service, hosted solution or the like for performing the above described functions. Alternatively, the mapping platform 103 may be directly integrated for processing data generated and/or provided by one or more services 119, content providers 123 or applications 111. Per this integration, the mapping platform 103 may perform client-side state computation of road curvature data.

By way of example, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 109 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.).

By way of example, the UE 109s, the mapping platform 103, the service platform 117, and the content providers 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
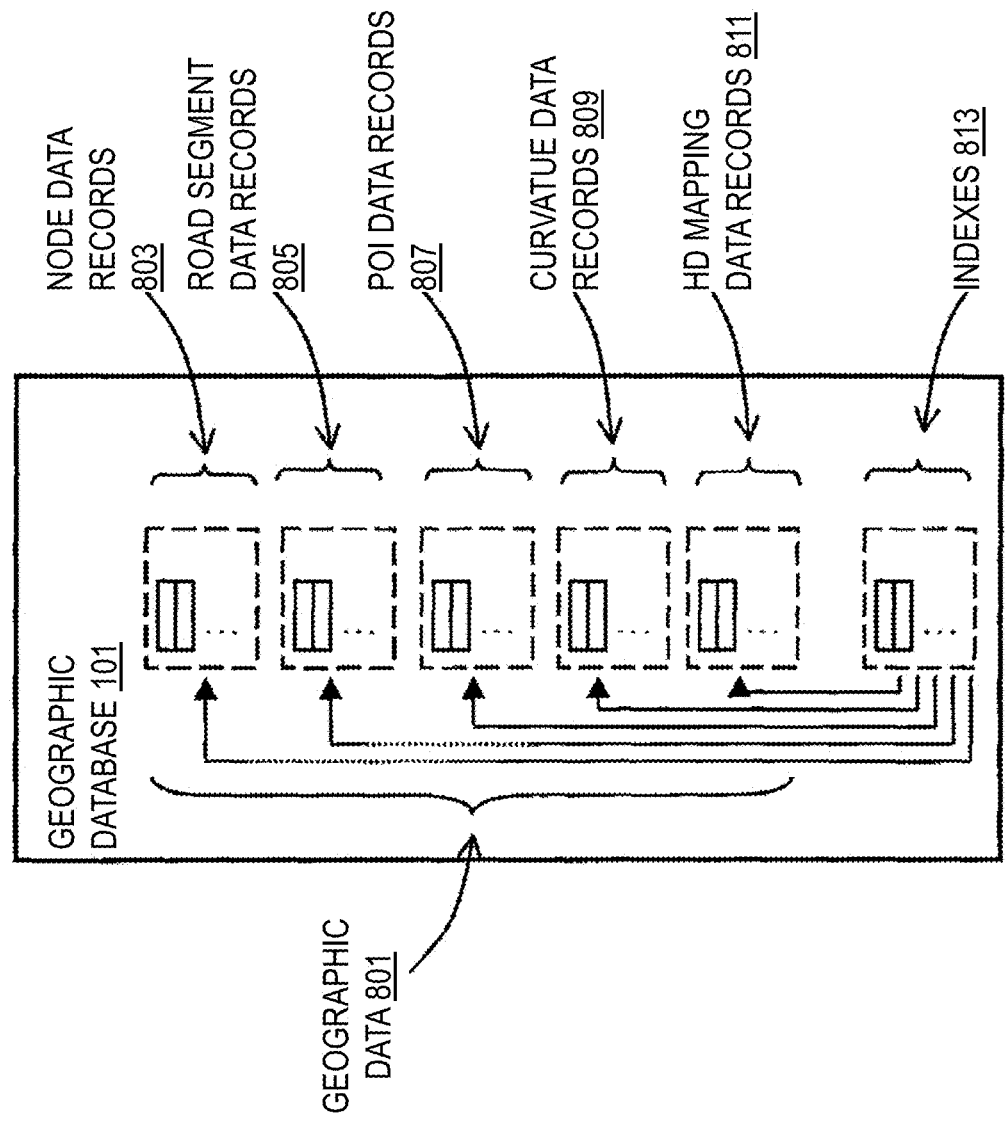
FIG. 8 is a diagram of a geographic database, according to one embodiment.

FIG. 8 is a diagram of a geographic database, according to one embodiment. In one embodiment, the geographic database 101 includes geographic data 801 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 801. In one embodiment, the geographic database 101 include high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 101 includes node data records 803, road segment or link data records 805, POI data records 807, curvature data records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 101. In one embodiment, the indexes 813 may be used to quickly locate data without having to search every row in the geographic database 101 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 101 can contain path segment and node data records or other data that represent pedestrian paths or areas in addition to or instead of the vehicle road record data, for example. In one embodiment, the nodes and links can make up the base map and that base map can be associated with an HD layer including more detailed information, like lane level details for each road segment or link and how those lanes connect via intersections. Furthermore, another layer may also be provided, such as an HD live map, where road objects are provided in detail in regards to positioning, which can be used for localization. The HD layers can be arranged in a tile format.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 807. The geographic database 101 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 101 can also include curvature data records 809 for storing curvature data for road segments and/or intersections. The curvature data records 809 can also store related data including but not limited to road segments falling within boxes or other bounded areas, fitted curves, underlying probe data, possible transitions at intersections, etc. By way of example, the map embedding data records 809 can be associated with one or more of the node records 803, road segment records 805, and/or POI data records 807 to associate the map embeddings with specific geographic areas or features. In this way, the map embedding data records 809 can also be associated with the characteristics or metadata of the corresponding records 803, 805, and/or 807.

In one embodiment, as discussed above, the HD mapping data records 811 model road surfaces and other map features to centimeter-level or better accuracy (e.g., including centimeter-level accuracy for ground truth objects used for visual odometry based on polyline homogeneity according to the embodiments described herein). The HD mapping data records 811 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 811 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like. The HD mapping data records may be provided as a separate map layer.

In one embodiment, the geographic database 101 can be maintained by the content provider 123 in association with the services platform 117 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. Other formats including tile structures for different map layers may be used for different delivery techniques. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 105 and/or UE 109. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing road curvature data from location trace data using machine learning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
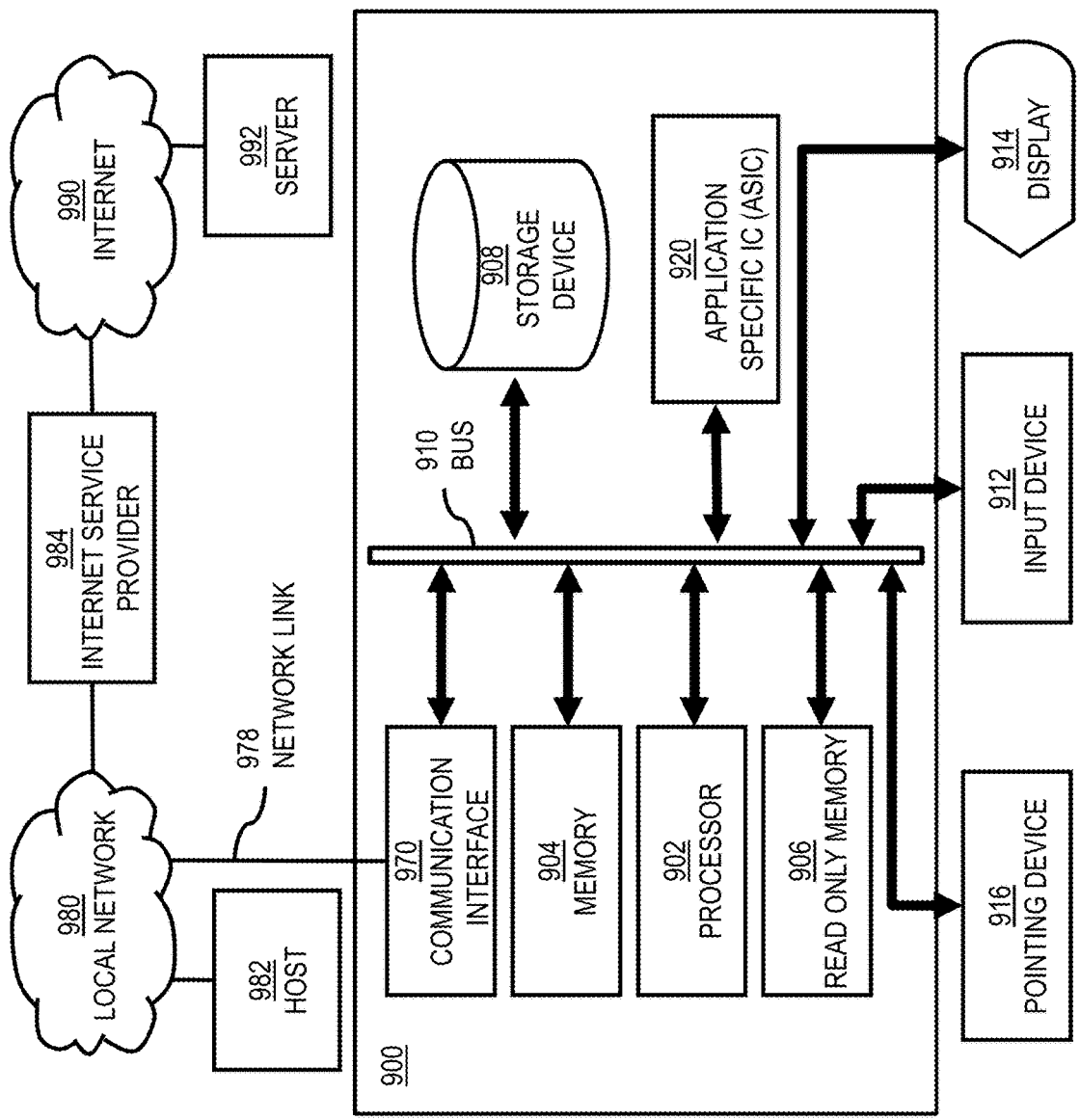
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide road curvature data from location trace data using machine learning as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to provide road curvature data from location trace data using machine learning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing road curvature data from location trace data using machine learning. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing road curvature data from location trace data using machine learning, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 121 for providing road curvature data from location trace data using machine learning.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to providing road curvature data from location trace data using machine learning as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide road curvature data based on location trace data using machine learning. The memory 1005 also stores the data associated with or generated by the execution of the inventive steps.

Figure 11:
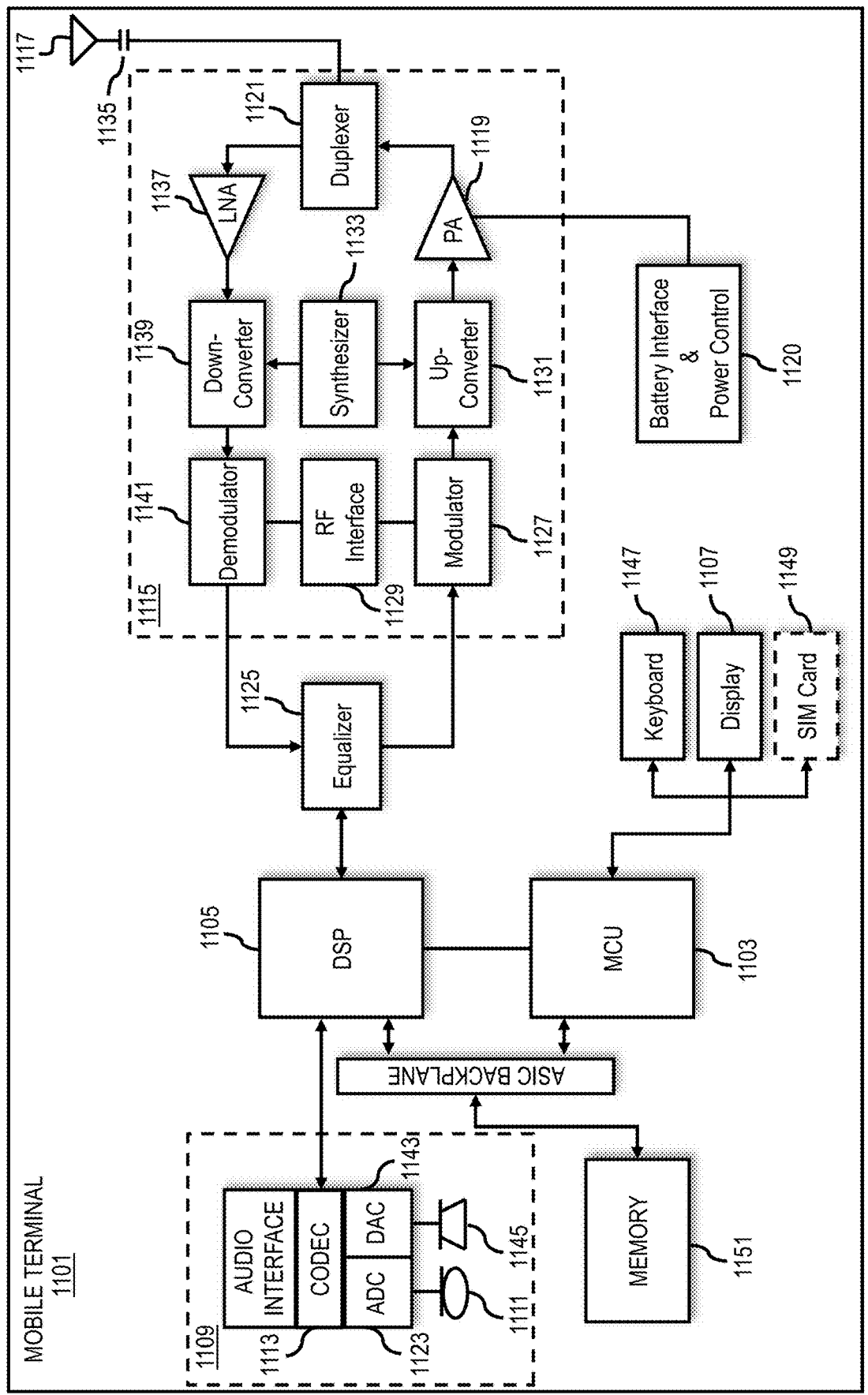
FIG. 11 is a diagram of a mobile terminal that can be used to implement an embodiment.

FIG. 11 is a diagram of exemplary components of a mobile terminal 1101 (e.g., the vehicle 105 or part thereof and/or UE 109) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide road curvature data based on location trace data using machine learning. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing road curvature data using machine learning comprising:
   map matching location trace data to a road network, wherein the location trace data is associated with ground truth curvature values;
   dividing the road network into a plurality of bounded areas;
   extracting one or more training features for each bounded area of the plurality of bounded areas, wherein the one or more training features comprise an average heading computed from the location trace data map matched to said each bounded area;
   training a machine learning model based on the one or more training features and the ground truth curvature values; and
   providing the trained machine learning model to predict a sign of the road curvature based on the average heading.

2. The method of claim 1, further comprising:
   converting location coordinates in the location trace data into a local coordinate system for said each bounded area; and
   creating a histogram for said each bounded area with a plurality of bins based on the local coordinate system, wherein the one or more training features are extracted from the histogram.

3. The method of claim 2, wherein a content of each bin of the plurality of bins includes a count of one or more locations traces of the location trace data falling within said each bin.

4. The method of claim 3, wherein the machine learning model is trained to predict a magnitude of the road curvature data based on the histogram.

5. The method of claim 2, wherein a content of each bin of the plurality of bins is based on a heading of the one or more location traces, and wherein the machine learning model is trained to predict the sign of the road curvature based on the heading.

6. The method of claim 2, further comprising:
   normalizing the content of said each bin based on a sum of all of the content of said each bin.

7. The method of claim 2, further comprising:
   determining a weight for each location trace of the one or more location traces based on a number of locations points contributed by said each location trace to said each bounded area,
   wherein the content of said each bin is further based on the weight for said each location trace.

8. The method of claim 2, wherein the histogram is a two-dimensional histogram with each dimension corresponding to an axis of the local coordinate system.

9. The method of claim 1, wherein said each bounded area has a variable size, and wherein the one or more training features include a scale of said each bounded area.

10. An apparatus for providing road curvature data using machine learning comprising:
    at least one processor; and
    at least one memory including computer program code for one or more programs,
    the at least one memory and the computer program code configured to, with the at least one processor, cause the apparatus to perform at least the following,
       map match location trace data to a road network, wherein the location trace data is associated with ground truth curvature values;
       divide the road network into a plurality of bounded areas;
       extract one or more training features for each bounded area of the plurality of bounded areas, wherein the one or more training features comprise an average heading computed from the location trace data map matched to said each bounded area;
       train a machine learning system based on the one or more training features and the ground truth curvature values; and
       use the trained machine learning system to predict a sign of the road curvature for the road network based on the average heading.

11. The apparatus of claim 10, wherein the machine learning system includes a first machine learning model to predict the sign of the road curvature, a second machine learning model to predict only a magnitude of the road curvature, or a combination thereof.

12. The apparatus of claim 11, wherein the apparatus is further caused to:
    apply the first machine learning model and the second machine learning model in sequence to predict the road curvature data.

13. The apparatus of claim 11, wherein the first machine learning model is trained to predict the sign in combination with the magnitude, and wherein the second machine learning model is trained to predict the magnitude.

14. The apparatus of claim 13, wherein the apparatus is further caused to:
    use the first machine learning model to predict the sign and the magnitude of the road curvature data; and
    use the second machine learning model to recalculate the magnitude based on determining that the magnitude predicted by the first machine learning model is greater than a threshold value.

15. A non-transitory computer readable storage medium for providing road curvature data carrying one or more sequences of one or more instructions which, when executed by one or more processors, cause an apparatus to perform:
    map matching location trace data to a road network, wherein the location trace data is associated with ground truth curvature values;
    dividing the road network into a plurality of bounded areas;
    extracting one or more training features for each bounded area of the plurality of bounded areas, wherein the one or more training features comprise an average heading computed from the location trace data map matched to said each bounded area;

training a machine learning model based on the one or more training features and the ground truth curvature values; and providing the trained machine learning model to predict a sign of the road curvature based on the average heading.

16. The non-transitory computer readable storage medium of claim 15, wherein the apparatus is caused to further perform:

converting location coordinates in the location trace data into a local coordinate system for said each bounded area; and creating a histogram for said each bounded area with a plurality of bins based on the local coordinate system, wherein the one or more training features are extracted from the histogram.

17. The non-transitory computer readable storage medium of claim 16, wherein a content of each bin of the plurality of bins includes a count of one or more locations traces of the location trace data falling within said each bin.

18. The non-transitory computer readable storage medium of claim 17, wherein the machine learning model is trained to predict a magnitude of the road curvature data based on the histogram.

19. The non-transitory computer readable storage medium of claim 16, wherein a content of each bin of the plurality of bins is based on a heading of the one or more location traces, and wherein the machine learning model is trained to predict the sign of the road curvature based on the heading.

20. A method for providing road curvature data using machine learning comprising:

map matching location trace data to a road network, wherein the location trace data is associated with ground truth curvature values;

dividing the road network into a plurality of bounded areas;

converting location coordinates in the location trace data into a local coordinate system for each bounded area of the plurality of bounded areas;

creating a histogram for said each bounded area with a plurality of bins based on the local coordinate system, wherein a content of each bin of the plurality of bins is based on a heading of one or more location traces;

extracting one or more training features for said each bounded area of the plurality of bounded areas from the histogram;

training a machine learning model based on the one or more training features and the ground truth curvature values; and providing the trained machine learning model to predict a sign of the road curvature based on the heading.

21. A method for providing road curvature data using machine learning comprising:

map matching location trace data to a road network, wherein the location trace data is associated with ground truth curvature values;

dividing the road network into a plurality of bounded areas;

extracting one or more training features for each bounded area of the plurality of bounded areas from the location trace data map matched to said each bounded area;

training a machine learning system based on the one or more training features and the ground truth curvature values, wherein the machine learning system comprises a first machine learning model and a second machine learning model; and providing the trained machine learning system to predict the road curvature data, wherein the first machine learning model is provided to predict a sign and a magnitude of the road curvature data; and wherein the second machine learning model is provided to recalculate the magnitude based on determining that the magnitude predicted by the first machine learning model is greater than a threshold value.

* * * * *